Jan. 5, 1954

M. E. VAN ORDEN 2,665,419

TELEVISION RECEIVER

Filed Jan. 23, 1952

2 Sheets-Sheet 1

INVENTOR
MILLARD E. VAN ORDEN.
BY [signature]
ATTORNEY

Jan. 5, 1954 M. E. VAN ORDEN 2,665,419

TELEVISION RECEIVER

Filed Jan. 23, 1952 2 Sheets-Sheet 2

INVENTOR
MILLARD E. VAN ORDEN.
BY Robert V. Morse
ATTORNEY

Patented Jan. 5, 1954

2,665,419

UNITED STATES PATENT OFFICE 2,665,419

TELEVISION RECEIVER

Millard E. Van Orden, Ithaca, N. Y.

Application January 23, 1952, Serial No. 267,861

1 Claim. (Cl. 340—369)

This invention relates to television receivers, and has for its general purpose the relieving of visual discomforts and the providing of greater comprehension, relaxation and enjoyment for viewers of television of all ages, and especially children. The visual pattern of seeing is a process not fully structured in the physical sense, that is, it differs from a camera in that it is not wholly mechanical or chemical; and our bodies do not have a point to point projection from a stimulus on the retina across to the brain, such as occurs for example in ordinary broadcasting between a radio station and a television receiver. On the contrary, the psychology of visual perception is such that we interpret the distance of an object principally by mental associations with size; and that involves continuous mental acts of judgment, which, though they may be unconscious or subjective, are none the less real. Such judgment is not something we are born with, but develops thru experience; and for that reason children are more susceptible than adults to faulty visual patterns and troublesome visual concessions when exposed to unfavorable visual demands.

This general psychological scientific principle has been recognized to some extent in various fields but has never been successfully applied to television receivers, even though there are many makes of receivers put out by manufacturers with scientific staffs, and the public as well as eye specialists have long been aware that there are numerous cases of eye strain from television. The visual fatigue or discomfort, sometimes resulting in disturbances recognized by the eye specialist, trouble people who have adequate visual acuity to meet their ordinary visual demands comfortably and effectively. The unpleasant experiences from television are one of the reasons many people do not purchase television sets. They do not want to subject their own eyes or the eyes of their children to the unusual strain.

Unlike the movies, the televised picture shows its actors and objects as small. It is only natural then for the viewer of television to interpret the actors as though they were at a great distance and to strain to see them just as observers would exert themselves to see characters in real life. The ordinary framed, recessed television screens that have been used in the past tend to intensify the tunneling effect much as if the scene were being watched thru a window. My invention brings the picture toward the viewers and insures that it is always seen in relation to adjacent spatially related objects and without a frame, so that there can be no tunneling effect. This makes the scene definitely a picture, not a window; causes pictured characters to appear larger and nearer; and results in less strain in mentally interpreting perspective. The eyes and associated mental reactions then become less confused; and the unadapted eyes, more characteristic of children, are given a simpler basis for adjustment.

In prior television cabinets the receiving screen on which the picture appears has generally been recessed within the framework of the cabinet. In some cases the border around the picture screen has been made lighter by light colored finish or translucent means which helped to some extent, but the picture still remained framed by the front of the cabinet which was relatively dark. This has caused the viewer to feel that the actual happening or picture on the screen was farther from him. It is this recessed or shadow-box type of receiving set that causes the tunneling of vision.

In general the present invention moves the receiving screen forward and preferably in front of the face of the cabinet. In any event, it puts the light colored border or frame in front of the face of the cabinet and definitely provides for illuminating the surrounding front face area of the cabinet by light transmitted laterally thru the sides of said border so that the cabinet face will not be dark, but will be visible to the viewer in a clear spatial relation involving no uncertainty of judgment. The illuminated projecting border, preferably translucent in the front and clear at the sides (where it lights up the cabinet face) may be graduated to a degree of translucence at various points so as to appear a mild illumination to the viewers from the front and not impare the picture on the screen. This blending of light from the margin of the picture in all directions around the screen and the lateral illumination of the cabinet face allow the viewers of television to recognize spatially related objects around the receiver and also reduces glare.

Referring now more particularly to the drawings forming part of this specification, Fig. 1 is a perspective view of a television receiver having its illuminating border or frame projecting out in front of the face of the cabinet so as to illuminate said face.

Similar reference numerals refer to similar parts thruout the various views.

Figure 1:
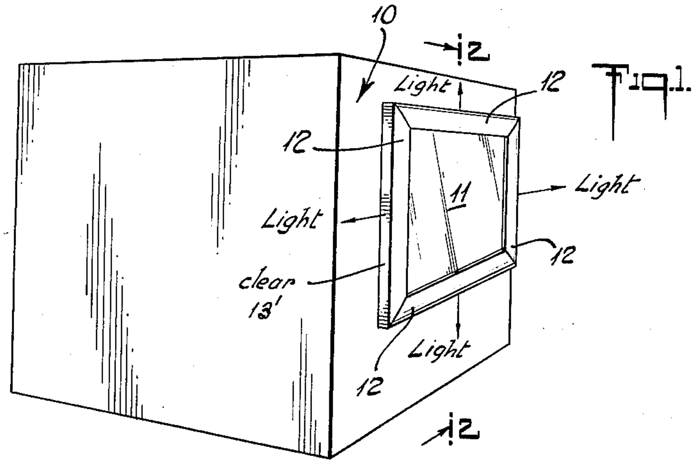
Figure 2:
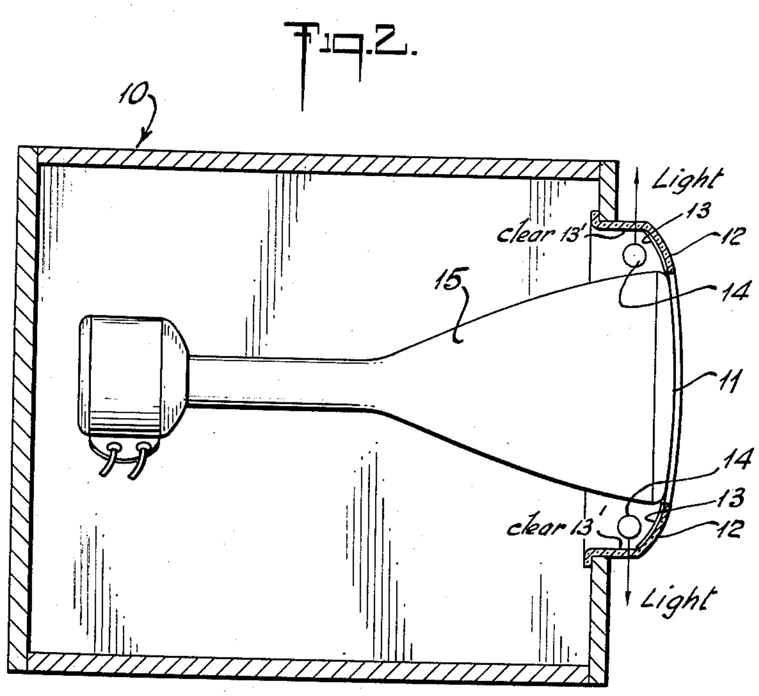
Fig. 2 is a cross-sectional view on the line 2—2 of Fig. 1.

Referring now to Fig. 1 and Fig. 2, the cabinet 10 which contains the television receiving apparatus has a viewing screen 11 which is located out in front of the face of the cabinet 10 instead of being recessed therein. This screen 11 is surrounded by an illuminating frame or border 12 which also projects out in front of the face of the cabinet 10. This illuminating frame 12 is preferably made of glass or plastic which can be treated to transmit light in varying degrees as desired. In order not to glare at the viewers, the front faces are treated as at 13 to have relatively more opacity than the side faces 13′ which are relatively clear. This is carefully graded so that viewers from the front see merely a gentle light on the frame or border of the picture and are not disturbed by it, while a stronger illumination is thrown out laterally by the lights 14 to fall upon the front face of the cabinet 10. This makes the cabinet clearly visible but does not glare since the stronger light does not fall directly on the eye but on the cabinet.

The viewing screen 11 is of course part of the television tube 15, and the surrounding frame or border 12 may be made integral with the tube 15 if desired or may be made separate. The latter is preferable in most cases at present, but quantity production may make an integral construction desirable as occurred with sealed-beam headlights on automobiles.

Figure 3:
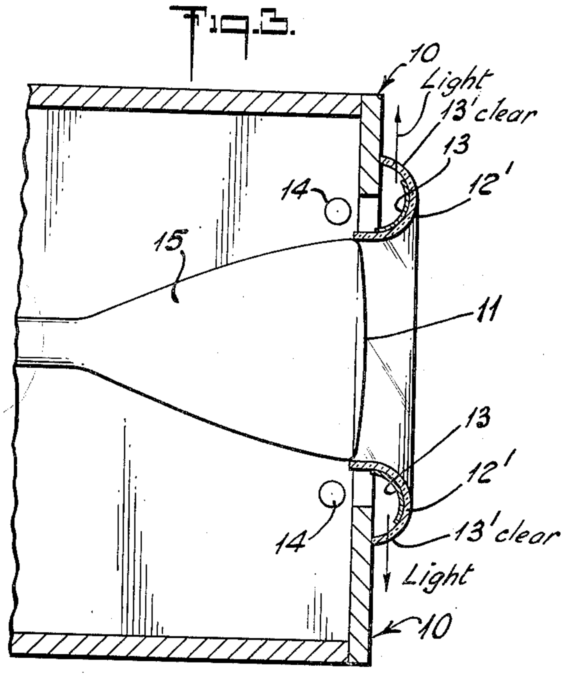
Fig. 3 is a cross-sectional view of a modification similar in principle to Fig. 2 so far as the illuminating border is concerned but with the picture screen itself behind instead of in front of the face of the cabinet.

In an early stage of a new development the manufacturers may not want to change the existing location of the operating parts of their sets, and so may prefer to leave the viewing screen 11 where it has been inside or under the front face of the cabinet. Fig. 3 shows a modification of the invention by which its principal advantages can still be obtained without changing the location of the viewing screen 11. In Fig. 3 the illuminating frame or border 12′ projects out in front of the cabinet as in Fig. 1 and Fig. 2 and so can also function to widen the border and illuminate the front of the cabinet; but in order to reach the viewing screen 11 the border 12′ extends further into the cabinet 10. The lights 14 in this case may be inside the cabinet and can be partially reflected outward by the equalizing layer 13.

Figure 4:
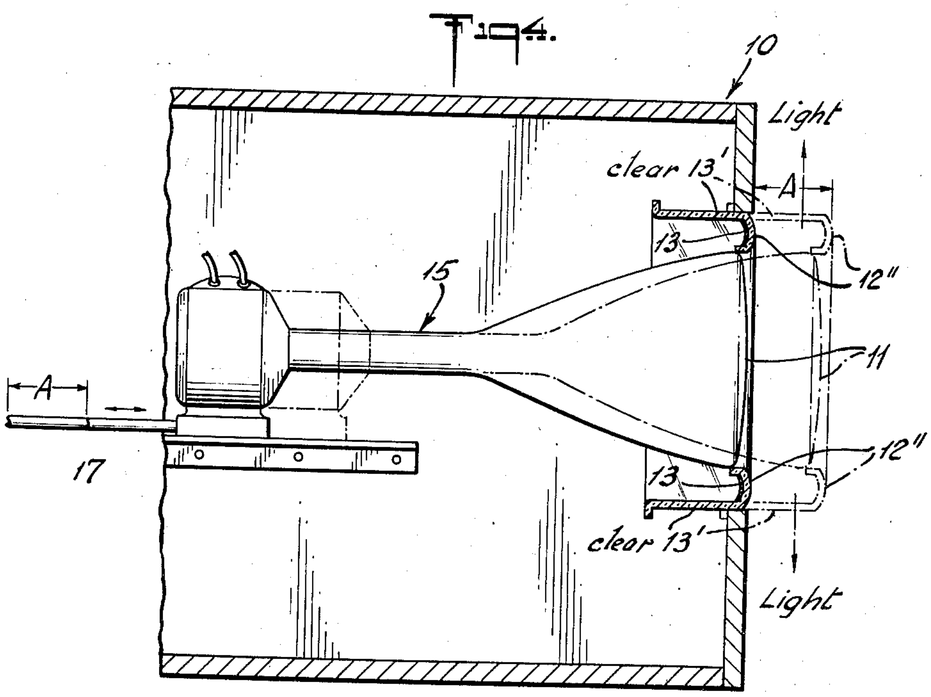
Fig. 4 illustrates a further type in which the same principles of lateral illumination of the cabinet face are involved, but providing for the retraction of the screen and illuminating frame or border when the receiver is not in use.

While the location of the picture border out in front of the face of the cabinet is essential to the operation of the present invention, some makers may prefer to withdraw that projecting portion to a flush or recessed position when the television receiver is not in use. Such a modification is shown in Fig. 4, where the illuminating frame or border 12″ is attached to the television tube 15 which in turn is mounted on a track so that it can be withdrawn or moved a distance A by any suitable means such as the rod 17. Various means have been patented in the past for retracting television tubes in cabinets in order to permit larger tubes in cabinets of limited size, and any such means may be used if desired, the particular mechanism being immaterial so far as the present invention is concerned.

The present invention relates primarily to the problem of relief from eye trouble in viewing television, and it is believed that the principles and structure here set forth will to a considerable degree overcome some of the present difficulties. The invention can be applied to receivers with very little additional expense.

In addition to reducing the previous concessions required by previous television sets and overcoming to a considerable degree the tunneling effect, the use of the projecting illuminating frame or border has a tendency to make the television viewing screen appear larger due to the lack of a sharp cut-off. Such a tendency appears in the well known optical illusion by which a white object appears to be larger than a black object of the same dimensions. In any event, the absence of any dark border in the frame or cabinet is more satisfying and pleasing to the average eye than the old recessed or shadow-box type of television receiver.

I am aware that some television receivers have had a viewing screen in front of the face of the cabinet, but that was merely to permit the emission of sound or to make the cabinet box smaller; and none of them accomplished the present result of illuminating the cabinet by a projecting border throwing the light back on the front of the cabinet to prevent contrast. They were not concerned with eye fatigue.

Any suitable internal lighting means may be used to illuminate the frame, preferably electric lights 14 particularly devoted to that purpose, or if preferred light emanating from other working tubes in the cabinet may be used. In Fig. 4 for example the electric lighting for the border frame could come from the interior of the television tube 15 and of course there can be various other working tubes in a television set to give off light. The particular form of the internal light source is immaterial and any well known means may be used so long as it is adequate to illuminate the front face of the cabinet as well as the border frame.

While I have in the foregoing described certain specific embodiments of the invention, it will be understood that they are merely by way of example to illustrate the principle of the device, which is not necessarily limited to the particular forms shown, but is susceptible to various modifications and adaptations in different installations as will be apparent to those skilled in the art without departing from the scope of the invention as stated in the following claim.

I claim:

In a television receiver, the combination of a cabinet having a front face, a television picture tube having a viewing screen, said screen being located in front of said face of the cabinet, a light transmitting border frame around said screen, said frame having a translucent portion bordering said screen as viewed from the front, said translucent bordering portion being substantially parallel to the face of the cabinet and in front thereof, said border frame also having a relatively clear outer portion at substantially right angles to the translucent portion and extending backward to the front face of the cabinet so that the major portion of the light can be transmitted laterally and backward to fall upon the front face of the cabinet whereby the cabinet is clearly perceived in its true spatial relation to the picture, and electric light means disposed around the border of the viewing screen and in front of the face of the cabinet but behind the translucent portion of the border frame, said light means being in the angle between the translucent front portion of the border frame and the relatively clear outer portion of said frame so that light may fall backward on the face of the cabinet and forward thru the translucent front portion to the observer's eye.

MILLARD E. VAN ORDEN.

References Cited in the file of this patent

UNITED STATES PATENTS

| Number | Name | Date |
|---|---|---|
| 2,298,870 | Cooper | Oct. 13, 1942 |

| Number | Name | Date |
|---|---|---|
| 2,330,604 | Messner | Sept. 28, 1943 |
| 2,350,889 | Harman | June 6, 1944 |
| 2,598,072 | Rose | May 27, 1952 |

FOREIGN PATENTS

| Number | Country | Date |
|---|---|---|
| 460,508 | Great Britain | Jan. 28, 1937 |

OTHER REFERENCES

Bedford, Abstract, #83,652, February 20, 1951.